UNITED STATES PATENT OFFICE.

FREDERIC A. EUSTIS, OF MILTON, MASSACHUSETTS, AND CHARLES PAGE PERIN, OF NEW YORK, N. Y., ASSIGNORS TO MOA BAY IRON COMPANY, A CORPORATION OF DELAWARE.

TREATMENT OF ORES.

1,185,187.     Specification of Letters Patent.     Patented May 30, 1916.

No Drawing.     Application filed December 27, 1915. Serial No. 68,624.

*To all whom it may concern:*

Be it known that we, FREDERIC A. EUSTIS and CHARLES PAGE PERIN, citizens of the United States, and residents of Milton, in the county of Suffolk and State of Massachusetts, and New York, in the county of New York and State of New York, respectively, have invented new and useful Improvements in the Treatment of Ores, of which the following is a specification.

This invention relates to a process of treating ores containing a plurality of metals capable of reduction together for an alloyed product. The invention is adapted, for instance, to the treatment of ores containing nickel and iron, or containing iron and chromium or manganese. The process is especially, though not exclusively, applicable to the treatment of such ores as the soft iron ores of the north coast of the island of Cuba. These ores consist essentially of oxids of iron and alumina, and typically contain relatively small amounts of the metals chromium, manganese and nickel, together with much water. Characteristic ores of this type bear a nickel content of the neighborhood of one per cent. and small amounts of chromium and manganese.

While the valuable nickel or chromium or manganese content may be extracted and obtained in a state of purity for separate use, it is desirable for many industrial uses to avoid the separate recovery of the metals from the ore. It is particularly desirable to avoid, for instance, the extraction of one of the contained metals when it is possible by the direct reduction of the ore to obtain by steps thereby cheapened and made more efficient an alloyed product, such as nickel-steel, for which the extracted metal would probably be used. It will be apparent that economies in the application of heat as well as further economies, either obvious or specifically mentioned herein, will be effected if the ore can be so treated as to convert it into a raw product capable of direct reduction into the desired alloy.

Objects of our invention are therefore to treat ores of the class mentioned in such a manner as to bring the relative proportions of two or more of their contained metals to a value enabling the direct reduction of the ores so treated into an alloyed metal.

A further object is to so treat such ores as to form a product bearing in the desired proportions reducible contents of metals capable of forming an alloy, with the complete recovery of a portion of one of the contained metals as a purified ore capable of separate reduction into that metal.

Further objects of our invention are to provide a process for the intermediate or preliminary treatment of nickeliferous iron-ores enabling a predetermined part of the ore to be enriched at the expense of the remainder of the ore with respect to one of the contained metals.

Further objects of our invention are to provide a treatment for nickeliferous iron-ores which shall be inexpensive, either in reagents, in heat or in handling of the materials, which will avoid the complete separation of any of the contained metals.

Further objects of our invention are to provide a wet process for extracting a nickel compound from a portion of nickeliferous iron-ore adapted to deposit the contained nickel compounds in a state of admixture, chemical or mechanical combination with a portion of the raw ore, if desired in a predetermined quantitative relation thereto, whereby to produce a body of enriched ore whose contents shall bear a proportionate relation to each other, adapting them for direct reduction as an alloy having predetermined, constant, relative contents.

Our invention also relates in one aspect to a process of producing from the ore a constant alloyed product containing a relative proportion of metals different from the relative proportion of metals in the ore.

In carrying out our invention we recommend the following steps: The ore is first divided into two or more portions, two of which may have a predetermined quantitative relation to each other, the relation being such as will secure, when all of one metal in both parts of the ore is taken into consideration, a proportion of that metal to one or more of the other metals contained in the quantity of one of the parts of ore which shall be in excess of that desired for the raw product of the subsequent smelting or other reduction processes. We now treat the first selected part to extract all or a part of one of its contained metals. To state for instance only a numerical relation, when the ore is the Cuban iron-ore mentioned, containing about one per cent. of nickel, the ore may be divided into a first part containing two and one-half tons for every ton in the second part.

The first part is now to be subjected to treatment presently to be explained for the recovery of all of a predetermined part of a selected metal, for instance to recover from the first part of the ore an easily recovered fraction of its nickel, for instance forty per cent., thereof. If desired, the nickel may be more fully recovered from the first part of the ore, and in that case, the first and second parts may be quantitatively the same, or the second part larger than the first part, depending on the proportions of the metals in the raw ore.

When we speak of recovery, we do not imply that the metallic content is to be brought to a state in which it can be treated commercially as a metal, but merely that it is brought to a state adapting it to be compounded, intermixed or deposited in connection with the ore of the second part, thereby to enrich the second part so that its nickel content is lifted to the neighborhood of two per cent. The second part, when so supplied with the nickel contents of the first part, will be in a condition enabling its direct smelting into nickeliferous pig-iron having metals in alloy therein in a right proportion for conversion into nickel-steel. The quantities mentioned are instances only, and we are not to be understood as being confined to said quantities or any specific quantities.

Having divided the ore into first and second parts, as mentioned, whatever its nature, the ore of the first part is subjected to treatment to render one of its contained metals soluble. In the instance mentioned, we prefer a sulfating treatment. The ore of the first part may be treated, for instance, by crushing, by then moistening with a sufficient quantity of sulfuric acid, as determined by the nickel contents, and then roasting the acidulated ore in a muffle furnace at a temperature of about 500° C. for a considerable period of time, for instance two hours or longer. The resulting product shows a relatively large proportion of soluble nickel sulfate and a relatively small proportion of soluble iron sulfate. But we prefer a sulfating treatment carried out by adding to the ore from 5% to 10% of its weight of a sulfur-bearing material, such as pyrites, and then roasting at a temperature of about 460° C. for a period of about four hours. The sulfating step above described is not herein claimed, being described and claimed in the application of Frederic A. Eustis, Serial No. 47,161, filed August 24, 1915.

The treated ore of the first part is now subjected to steps for the removal of the soluble nickel sulfate, along with such other soluble salts of the contained metals as may have been formed as an incident of the treatment adopted. This step preferably comprises leaching with an acid solution, such as a dilute solution of sulfuric acid, the object of the sulfating and leaching steps being merely to recover all or a predetermined part of the nickel content (and of the other lesser inclusions of the raw ore). It is not material whether a part of the iron is also brought into the solution. The sulfating and leaching steps may therefore be so conducted as not to be capable of producing the nickel in a pure state, and still reach all the advantages of our present invention.

In some cases, the raw ore of the first part having been treated so as to render the nickel or other lesser inclusion thereof soluble, a partial solvent may be used as a leach, for instance hot water. When an acid leach is used, other acids than sulfuric acid may be employed, such as a solution containing about 7% of hydrochloric acid and $\frac{1}{2}$ of one per cent. of sulfuric acid.

The soluble nickel compound (or the compound of the other lesser contained metal) may now be placed in a condition adapting it to be applied directly to the raw ore of the second part of the original mass of ore, whereby to enrich it with respect to the metals held in compound and in solution in the extract formed by the steps above described. One way of doing this is to evaporate the solution, if desired while in contact with the ore to be enriched.

We prefer, in order to avoid the heat and time required on an evaporation of the leaching water or the aqueous part of the leaching solution, to precipitate the metal-bearing compounds as by the addition of soda-ash or other base, for instance any carbonate of the alkaline earths, such as limestone, or sodic hydrate or ammonia. Such precipitation will carry down the contained alumina, iron, manganese and other salts as well as the nickel mentioned.

The solution may be precipitated while directly in contact with the ore of the second part in a suitable vat or vessel, the exhausted solution being drawn off after the operation. If desired, the operation may be continuous, the ore being carried through precipitating vats receiving the dissolved contents of the ore of the first part, the precipitating reagent and the raw ore at predetermined rates, the ore being removed and the exhausted solutions discharged in any desired manner. As an alternative, the precipitate may be collected, dried, and mixed with the finely comminuted ore of the second part. Such collection of the precipitate may be by decantation or filtration, and in the case of filtration, the filter bed may be comprised of the finely divided ore of the second part. If desired, the filtrate, precipitate or residue of the precipitated solution may be collected, dried and ground or mixed with the ore of the second part as a part preparation for sintering or as an incident of any other step during or prior to smelting. That part of the ore which is being treated by sulfating and leaching has been purified of the contents rendered soluble by the sulfating step, and in practice is washed, dried and prepared for sintering as a purified iron ore by-product. The commercial value of this residue of ore has not been lessened by depriving it of its small proportions of contained metals.

While we have described our process in connection with a particular ore or a particular alloyed product, it will be understood that the principles involved are applicable without change to the treatment of other ores having contents occurring in proportions rendering them unfit for use as the direct source of an alloyed product.

What we claim is:—

1. The process of treating ores containing a plurality of metals capable of reduction together for an alloyed product, comprising first dividing the ore into predetermined quantitative parts, then subjecting one of the parts to treatment for the separation of an extract containing a compound of one of the metals, and mixing the extract with a part of the ore not so treated, whereby to obtain a product of ore enriched as to its contents of one metal relatively to its contents of another metal, and a by-product of ore improved by the selective extraction of one or more of the metals.

2. The process of treating nickeliferous iron-ore containing nickel in proportions too slight for useful reduction into an alloyed product such as nickeliferous molten metal adapted for direct conversion into nickel-steel, comprising the following steps: first dividing the ore into parts, then treating one part selectively to remove from the iron a nickel-bearing extract; mixing the extract with the other part; and thereafter reducing the mixed product.

3. The steps in the production of alloyed metals by direct reduction from the ore comprising subjecting a part of a mass of ore containing the metals to be produced in alloy to treatment for the extraction therefrom of a compound of one of the metals; then mixing the extract with another part of the ore not so treated, and thereafter reducing said ore and the admixed extract together to obtain a metal alloyed in proportions determined by the relative proportion of the metals in the raw ore and the relative amounts of ore subjected to extraction and to addition of the extract.

4. The steps in the production of alloyed metals by direct reduction from the ore, comprising first dividing a mass of ore containing the metals to be produced in alloy into predetermined parts; then subjecting one part to treatment for the extraction therefrom of a compound of one of the metals; then mixing the extract with the other part of the ore, and thereafter reducing said ore and the admixed extract together to obtain a metal alloyed in proportions determined by the relative proportion of said parts.

5. The process of treating ores containing a plurality of metals capable of reduction together for an alloyed product, comprising subjecting a part of the ore to treatment including leaching, whereby to separate therefrom a soluble extract containing a compound of one of the metals and then precipitating a predetermined quantity of the extract upon a predetermined quantity of ore not so treated, whereby to obtain a product of ore enriched to a predetermined degree as to its contents of one metal relatively to its contents of another metal.

6. The steps in the production of alloyed metals by direct reduction from the ore comprising first treating a quantity of ore containing a known relative proportion of the metals to be produced in alloy, for the extraction therefrom of a compound containing a known part of one of the metals; and then mixing the extract with a quantity of the raw ore determined by the amount of the metal of said extract, and thereafter reducing said ore and the admixed extract together, thereby to obtain a metal alloyed in constant and the desired proportions differing from the relative proportions of the components of said alloy in the raw ore.

7. The process of treating nickeliferous iron-ore comparatively poor in nickel whereby to enable direct reduction into an alloyed product, such as nickeliferous molten metal, comprising the following steps: dividing the ore into parts, then sulfating one part with the aid of heat, then leaching said part to dissolve soluble nickel-bearing sulfur compounds so formed; removing the dissolved compounds, and thereafter removing the water of solution and depositing the residual extract on another part of the raw ore, and thereafter smelting the mixed extract and ore together to obtain the alloyed metals.

8. The process of treating nickel-bearing iron-ores comprising the division of the ore into two parts, extracting nickel compounds in a soluble state from one part, and precipitating the dissolved compounds on the ore of the other part.

9. The process of treating nickel-bearing iron-ores in which the nickel content is relatively small comprising subjecting a portion only of the ore to a sulfating roast, then leaching out the soluble nickel-bearing and other compounds so formed, and thereafter precipitating the metalliferous compounds from the leaching liquor on a portion of raw ore, whereby to enrich the same.

10. The process of treating nickeliferous iron-ores comprising the steps partially recovering nickel-bearing compounds from one portion of the ore in a state adapting said compounds to be deposited in intimate contact with a body of ore containing undissolved nickel compounds in a natural state and then depositing said compounds on another portion of the ore, whereby to form an enriched ore adapted for direct smelting to obtain a nickel-iron alloy.

11. The process of treating nickeliferous iron-ores comprising the steps crushing the ore, dividing the crushed ore into predetermined quantitative parts; subjecting one part to treatment by heat in the presence of a sulfur-bearing compound, whereby to form sulfates of contained metals; thereafter leaching out the soluble sulfates; and thereafter treating the other part of said ore by precipitating upon it the metalliferous compounds from the leaching liquor, removing the excess of liquid, drying, and smelting.

Signed by me at Boston, Massachusetts, this twenty-fourth day of December, 1915.

FREDERIC A. EUSTIS.

Signed by me at New York, New York, this twenty-fourth day of December, 1915.

CHARLES PAGE PERIN.